(12) United States Patent
Ogburn

(10) Patent No.: US 6,491,120 B1
(45) Date of Patent: Dec. 10, 2002

(54) METHOD FOR OPERATING A HYBRID VEHICLE AND A HYBRID VEHICLE INCORPORATING THE METHOD

(75) Inventor: Michael Ogburn, Davisburg, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/683,558

(22) Filed: Jan. 18, 2002

(51) Int. Cl.[7] .............................. B60K 6/00; B60K 8/00
(52) U.S. Cl. ....................... 180/65.2; 180/2.2; 180/65.3; 180/65.6
(58) Field of Search ................ 180/65.2, 65.3, 180/65.6, 2.1, 2.2

(56) References Cited

U.S. PATENT DOCUMENTS

| | | | |
|---|---|---|---|
| 3,861,484 A | * 1/1975 | Joslin | 180/65.2 |
| 5,141,173 A | * 8/1992 | Lay | 244/2 |
| 5,343,970 A | 9/1994 | Severinsky | |
| 5,650,713 A | * 7/1997 | Takeuchi et al. | 322/16 |
| 5,722,359 A | * 3/1998 | Chubachi et al. | 123/192.2 |
| 5,887,670 A | * 3/1999 | Tabata et al. | 180/65.2 |
| 5,908,077 A | * 6/1999 | Moore | 180/65.2 |
| 5,910,722 A | * 6/1999 | Lyons et al. | 320/104 |
| 6,102,144 A | 8/2000 | Lutz | |
| 6,176,808 B1 | 1/2001 | Brown et al. | |
| 6,263,267 B1 | 7/2001 | Anthony et al. | |
| 6,306,057 B1 | * 10/2001 | Morisawa et al. | 475/5 |
| 6,313,394 B1 | * 11/2001 | Shugar et al. | 136/244 |
| 6,371,878 B1 | * 4/2002 | Bowen | 475/5 |

* cited by examiner

*Primary Examiner*—Paul N. Dickson
*Assistant Examiner*—Laura B. Rosenberg

(57) ABSTRACT

A method for operating a hybrid vehicle and a hybrid vehicle 10 which operates in accordance with the method. Particularly, the hybrid vehicle 10 includes a pair of torque generators 12, 14 which provide torque by moving in dissimilar directions as the hybrid vehicle 10 is started and stopped, thereby reducing inertia related noise and vibration.

11 Claims, 1 Drawing Sheet

METHOD FOR OPERATING A HYBRID VEHICLE AND A HYBRID VEHICLE INCORPORATING THE METHOD

BACKGROUND OF INVENTION

1. Field of the Invention

The present invention generally relates to a method for operating a hybrid vehicle and to a hybrid vehicle which incorporates the method and more particularly, to a method which allows a hybrid vehicle to be selectively and smoothly started and stopped.

2. Background of the Invention

A hybrid vehicle typically includes a first and a second source of torque which are selectively activatable and which provide torque to the wheels of the vehicle, effective to allow the vehicle to be propelled and maneuvered. Typically, the first source of torque comprises an internal combustion engine and the second source of torque comprises an electrical generator, although other torque generation configurations may be utilized.

While the foregoing arrangement does provide many desirable benefits, it has some drawbacks. That is, a certain amount of inertial force must be overcome in order to start the hybrid vehicle from rest (e.g., in order to turn or rotate the stationary engine and the generator). This initial activation causes a certain amount of reactive force (which is substantially equal to the amount of the inertial force) to be undesirably communicated into the hybrid vehicle, thereby causing undesirable vibration and noise (e.g., inertia related noise and vibration). Substantially the same type of reaction force is also communicated into the hybrid vehicle as the vehicle (e.g., the engine) is stopped. While various strategies are utilized to overcome this drawback, these strategies are costly, complex, and relatively ineffective.

SUMMARY OF INVENTION

It is a first non-limiting advantage of the present invention to provide a method for operating a hybrid vehicle which overcomes some or all of the previously delineated drawbacks associated with prior hybrid vehicle operating strategies.

It is a second non-limiting advantage of the present invention to provide a hybrid vehicle which overcomes some or all of the previously delineated drawbacks of prior hybrid vehicles.

It is a third non-limiting advantage of the present invention to provide a method for selectively and smoothly stopping and starting a hybrid vehicle.

It is a fourth non-limiting advantage of the present invention to provide a hybrid vehicle engine which may be selectively and smoothly started and stopped.

According to a first non-limiting aspect of the present invention, a hybrid vehicle is provided. Particularly, the hybrid vehicle includes a first source of torque which includes a first member which rotates in a first direction at a certain time; and a second source of torque which includes a second member which rotates in a second direction during the certain time.

According to a second non-limiting aspect of the present invention, an apparatus for use in combination with a hybrid vehicle of the type which may be selectively started and stopped and having a first and a second source of torque which respectively rotate in a certain direction, is provided. The provided apparatus comprises an assembly which is coupled to the first source of torque; a controller which is coupled to the assembly and which senses the starting of the hybrid vehicle;

and a reversing gear which is coupled to the controller and to the first source of torque and which is activated by the controller in response to the sensed starting of the hybrid vehicle, thereby causing the assembly to reverse the certain rotational direction of the first source of torque.

According to a third non-limiting aspect of the present invention, a method for operating a hybrid vehicle having a first and a second source of torque, each of the first and second sources of torque having a respective direction of movement is provided. The method comprises the step of reversing the direction of movement of the first source of torque during a certain period of time.

These and other features, aspects, and advantages of the present invention will become apparent from a reading of the following detailed description of the preferred embodiment of the invention in combination with the following drawings.

DETAILED DESCRIPTION

Figure 1:
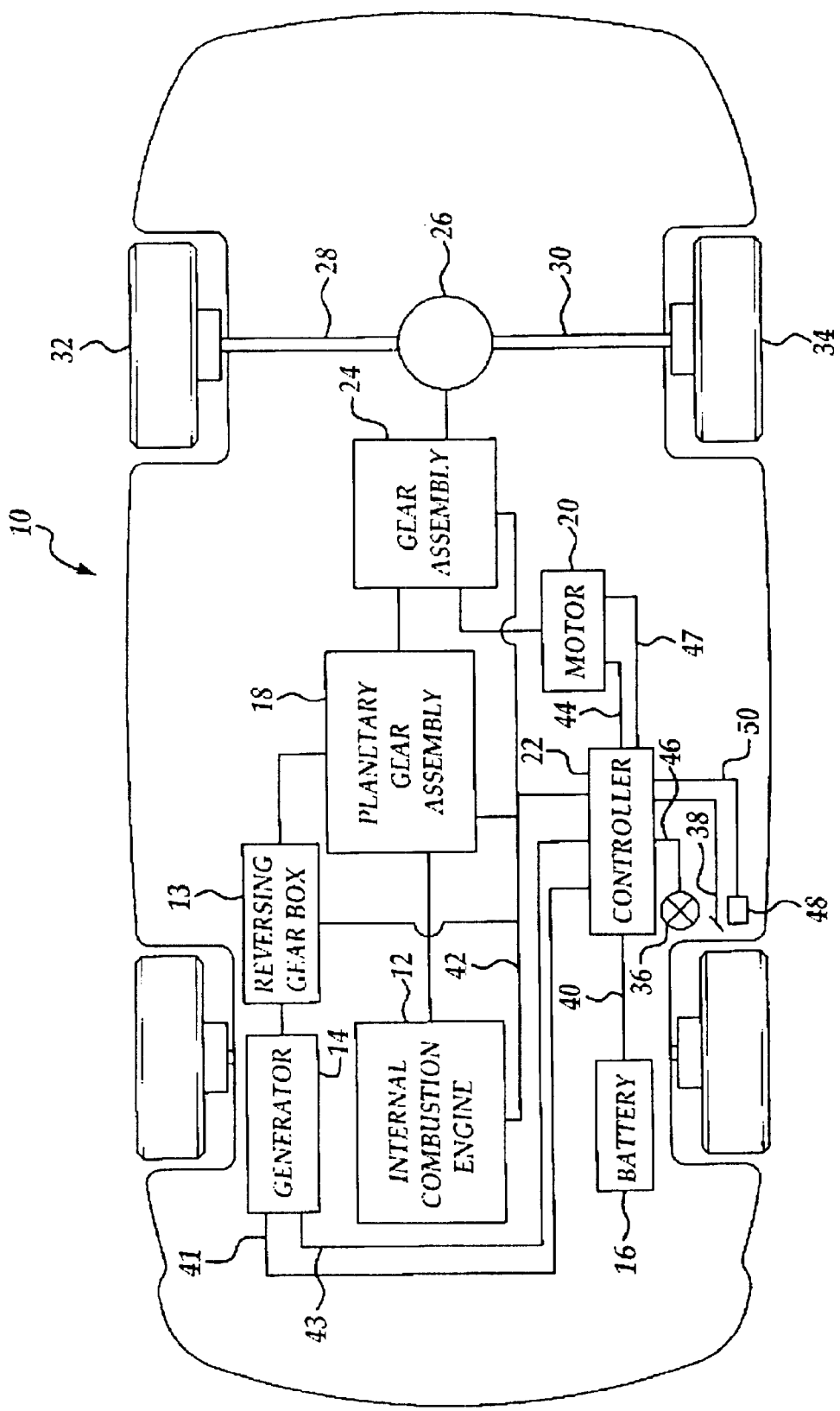
FIG. 1 is a block diagram of a hybrid vehicle which incorporates an assembly which is made in accordance with the teachings of the preferred embodiment of the invention and which operates in accordance with the methodology of the preferred embodiment of the invention.

Referring now to FIG. 1, there is shown a hybrid vehicle 10 which is made in accordance with the teachings of the preferred embodiment of the invention. As shown, hybrid vehicle 10 includes a first energy source or a provider of torque 12, such as an internal combustion engine, a second energy source or a provider of torque 14, such as an electrical generator, a source of electrical energy 16, such as a battery, a planetary gear assembly 18, a reversing gear assembly or gear box 13, a traction motor 20, a controller 22 which is operable under stored program control, a gear assembly 24, a differential assembly 26, a pair of axles or half-shafts 28, 30, and a pair of wheels 32, 34 which are respectively attached to the axles or half-shafts 28, 30. It should be appreciated that the torque generators 12, 14 may each alternatively comprise a solar array assembly, a fuel cell assembly, or substantially only other type of energy source in combination with a selectively rotatable or torque providing member.

The hybrid vehicle 10 further includes a selectively movable ignition switch 36 and a selectively movable brake pedal 38. It should be appreciated that only the relevant portions of the hybrid vehicle 10 are shown in FIG. 1 and that the method and principles of the preferred embodiment of the invention are applicable to a wide variety of dissimilar hybrid vehicle configurations. Hence, nothing in this description is meant to limit the use of the methodology or the assembly of the present invention to a particular type of vehicular configuration, such as that which is shown in FIG. 1.

As shown, the controller 22 is coupled to the battery 16 by the use of bus 40 and the controller 22 is coupled to the generator 14 by the use of buses 41, 43. The controller 22 is coupled to the internal combustion engine 12, to the planetary gear assembly 18, to the reversing gear assembly 13, and to the gear assembly 24 by the use of bus 42. Further, the controller 22 is coupled to the traction motor 20 by the use of buses 44 and 47, to the ignition switch 36 by use of the bus 46, and to a position sensor 48 by the use of a bus 50. Particularly, the position sensor 50 is adapted to sense the position of the selectively movable brake pedal member 38 and to communicate this information to the controller 22 by the use of bus 50 (e.g., to communicate, to the controller 22, that the brake pedal member 38 is being depressed, indicative of a desired stop of the hybrid vehicle). The brake pedal member. 38 may also, in an alternate embodiment, be coupled to the controller 22.

Further, as shown, the generator 14 is coupled to the reversing gear assembly 13, and the internal combustion engine 12 and the reversing gear 13 are each coupled to the planetary gear assembly 18. Moreover, as shown, the planetary gear assembly 18 is coupled to the gear assembly 24. The gear assembly 24 is coupled to the differential assembly 26, the motor 20 is coupled to the gear assembly 24, and the differential assembly 26 is receivably coupled to the axles or half-shafts 28, 30. It should be appreciated that the controller 22 may actually comprise several cooperatively coupled controllers and that, as is more evident below, the combination of the controller 22, the sensor 48, and the reversing gear assembly 13, may cooperatively comprise an apparatus or assembly which may be utilized in existing hybrid vehicles (e.g., in a retrofit manner or as part of the originally provided equipment) in order to reduce or substantially eliminate inertia related vibrations and noise and, as such, this combination represents an inertial noise and vibration elimination and reduction assembly which is made in accordance with the teachings of this invention.

In normal operation (after the vehicle 10 has been started and is running), the internal combustion engine 12 and the generator 14 may each or in combination with the other generate torque and communicate the torque to the planetary gear assembly 18. Hence, in normal operation, one or both of the torque producers or sources 12, 14 are selectively activated by the controller 22. Particularly, when it is desired to activate the generator 14, the controller 22 provides electrical ground potential on bus 41 and sources energy, from battery 16, to the generator 14 on bus 43, thereby causing the generator to spin or turn in a first direction. Such power may also be sourced from the battery 16 to the internal combustion engine 12 in order to allow combustion to occur within the engine 12, thereby allowing the engine 12 (e.g., the crankshaft (not shown) of the engine 12) to rotate in the first direction. The produced torque is communicated from the generator 14 through the deactivated reversing gear assembly 13 to the planetary gear assembly 18 and from the internal combustion engine 12 to the planetary gear assembly 18. The produced torque is then communicated from the planetary gear assembly 18 to the gear assembly 24 and the gear assembly 24 communicates the torque to the differential assembly 26, thereby allowing the produced torque to be communicated to the wheels 32, 34, effective to allow the hybrid vehicle 10 to be selectively propelled and maneuvered. The traction motor 20 may be selectively energized by the controller 22 in order to increase the amount of torque which is communicated to the gear assembly 24 in the event that additional toque is needed or required to operate the hybrid vehicle 10. Particularly, the energization of the motor 20 is achieved by causing electrical energy to be communicated from the battery 16 to the motor 20 on bus 44 and by causing electrical ground potential to be supplied to the motor by bus 47.

When it is desired to start the hybrid vehicle 10 from rest, the ignition switch 36 is moved to the start position. This movement is sensed by the controller 22 and, upon sensing the movement of the ignition switch 36 to this position, the controller 22, in one non-limiting embodiment of the invention, selectively activates the reversing gear assembly 13, and energizes the generator 14 and/or to the internal combustion engine 12. The activated reversing gear assembly 13 reverses the direction of the torque received from the generator 14 and communicates this reversed torque to the planetary gear assembly 18, effective to counteract or cancel the inertia associated with the internal combustion engine 12 and substantially reducing or eliminating inertia related vibration and noise. This reversal is continued until the hybrid vehicle begins to move (e.g., the controller 22 may sense such movement by the use of a wheel sensor (not shown)) or for a certain predetermined time (e.g., about five seconds). It should be realized that other assemblies may perform the functionality of the reversing gear 13 and that nothing in this description is meant to limit the present invention to a hybrid vehicle including such a reversing gear assembly 13. For example and without limitation, the reversing gear assembly 13 may be eliminated by directly connecting the engine 12 and the generator 14 to the planetary gear assembly 18. In this non-limiting embodiment, the controller 22 may cause the energy which is communicated to the generator 14 to be selectively reversed (e.g., electrical energy is placed on bus 41 and electrical ground potential is placed on bus 43) when the vehicle 10 is being started, thereby causing the generator to spin in a second and opposite direction to the internal combustion engine 12, thereby counteracting or canceling the inertia associated with the internal combustion engine 12 and substantially reducing or eliminating inertia related vibration and noise without the use of a reversing gear assembly 13. Moreover, in yet another alternate embodiment of the invention, the reversing gear assembly 13 may be selectively applied to the crankshaft (not shown) of the internal combustion engine 12. The strategy may also be used when the controller 22 senses that the vehicle 10 is to be stopped (e.g., by the use of a wheel sensor (not shown) or by sensed depression of the brake pedal member 38).

It is to be understood that the invention is not limited to the exact construction and methodology which is delineated above, but that various changes and modifications may be made without departing from the spirit and the scope of the inventions as are delineated in the following claims.

What is claimed is:

1. An apparatus for operating a hybrid vehicle having a first and a second source of torque which each rotate in a certain respective rotational direction, said hybrid vehicle being further adapted to be selectively started and stopped, said apparatus comprising:
   an assembly which is coupled to said first source of torque;
   a controller which is coupled to said assembly and which senses said starting of said hybrid vehicle; and
   a reversing gear which is coupled to said controller and to said first source of torque and which is activated by said controller in response to said sensed start of said hybrid vehicle, thereby causing said assembly to reverse said certain rotational direction of said first source of torque, wherein said controller further senses the stoppage of said hybrid vehicle and, in response to said sensed stoppage of said hybrid vehicle, said controller causes said reversing gear assembly to reverse said rotational direction of said first source of torque.

2. The apparatus of claim 1 wherein said first source of torque comprises an electrical generator.

3. The apparatus of claim 2 wherein said second source of torque comprises an internal combustion engine.

4. The apparatus of claim 2 wherein said second source of torque comprises a solar panel array assembly.

5. A The apparatus of claim 2 wherein said second source of torque comprises a solar panel array assembly.

6. A method for operating a hybrid vehicle having a first and a second source of torque, each of said first and second sources of torque having a respective rotational direction of movement, said hybrid vehicle being further adapted to be selectively started and stopped, said method comprising the steps of:

providing an assembly which is coupled to said first source of torque;

providing a controller which is coupled to said assembly and which senses said starting and said stopping of said hybrid vehicle;

providing a reversing gear which is coupled to said controller and to said first source of torque;

activating said reversing gear in response to said sensed start of said hybrid vehicle, thereby causing said assembly to reverse said certain rotational direction of said first source of torque;

activating said reversing gear in response to said sensed stopping of said hybrid vehicle, thereby causing said assembly to reverse said rotational direction of said first source of torque; and reversing said direction of movement of said first source of torque during a certain period of time.

7. The method of claim 6 wherein said certain period of time comprises the time during which said hybrid vehicle is being started.

8. The method of claim 6 wherein said certain period of time comprises the time during which the hybrid vehicle is being stopped.

9. The method of claim 6 wherein said first source of torque comprises an electric generator.

10. The method of claim 6 wherein said second source of torque comprise an internal combustion engine.

11. The method of claim 6 wherein said certain period of time comprises about five seconds.

\* \* \* \* \*